(12) United States Patent
Kumagai et al.

(10) Patent No.: US 11,458,936 B2
(45) Date of Patent: Oct. 4, 2022

(54) DRIVE ASSIST APPARATUS

(71) Applicant: SUBARU CORPORATION, Tokyo (JP)

(72) Inventors: Hikaru Kumagai, Tokyo (JP); Zhaofei Dong, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 378 days.

(21) Appl. No.: 15/968,063

(22) Filed: May 1, 2018

(65) Prior Publication Data
US 2019/0023241 A1 Jan. 24, 2019

(30) Foreign Application Priority Data
Jul. 18, 2017 (JP) .............................. JP2017-139359

(51) Int. Cl.
- *B60T 7/22* (2006.01)
- *B60T 8/172* (2006.01)
- *B60T 8/171* (2006.01)
- *B60T 8/74* (2006.01)

(Continued)

(52) U.S. Cl.
CPC ............... *B60T 7/22* (2013.01); *B60T 8/171* (2013.01); *B60T 8/172* (2013.01); *B60T 8/74* (2013.01); *G06V 20/58* (2022.01); *G06V 20/588* (2022.01); *B60T 2201/022* (2013.01);
(Continued)

(58) Field of Classification Search
CPC . B60T 7/22; B60T 8/172; B60T 8/171; B60T 8/74; B60T 2230/03; B60T 2201/022; B60T 2210/32; G06K 9/00798; G06K 9/00805; B60Y 2300/09
See application file for complete search history.

(56) References Cited

U.S. PATENT DOCUMENTS

| | | | | |
|---|---|---|---|---|
| 3,794,972 A | * | 2/1974 | Van Ostrom | G01P 15/165 340/467 |
| 6,070,682 A | * | 6/2000 | Isogai | B60K 31/0008 180/167 |

(Continued)

FOREIGN PATENT DOCUMENTS

JP H05-270371 A 10/1993

*Primary Examiner* — Peter D Nolan
*Assistant Examiner* — Michael F Whalen
(74) *Attorney, Agent, or Firm* — McDermott Will & Emery LLP (57) ABSTRACT

A drive assist apparatus includes a detector and a traveling controller. The detector detects an operation target of automatic emergency braking of a vehicle. The traveling controller includes a calculator and a determiner, and controls the automatic emergency braking on the basis of a result of the detection performed by the detector. The calculator calculates each of a target deceleration rate and a variation rate. The target deceleration rate is a target value of a deceleration rate of the automatic emergency braking. The variation rate is a rate of variation in the deceleration rate required for the deceleration rate of the automatic emergency braking to reach the target deceleration rate. The determiner determines a contact risk of the vehicle with the operation target on the basis of the target deceleration rate. The calculator increases the variation rate when the contact risk is determined by the determiner as being relatively high.

3 Claims, 6 Drawing Sheets

(51) Int. Cl.
*G06V 20/58* (2022.01)
*G06V 20/56* (2022.01)

(52) U.S. Cl.
CPC ....... *B60T 2210/32* (2013.01); *B60T 2230/03* (2013.01); *B60Y 2300/09* (2013.01)

(56) References Cited

U.S. PATENT DOCUMENTS

| | | | | |
|---|---|---|---|---|
| 6,122,585 | A * | 9/2000 | Ono | B60T 8/172 |
| | | | | 701/71 |
| 6,393,361 | B1 * | 5/2002 | Yano | B60T 7/14 |
| | | | | 340/436 |
| 2004/0167702 | A1 * | 8/2004 | Isogai | B60T 7/22 |
| | | | | 701/96 |
| 2004/0199327 | A1 * | 10/2004 | Isogai | B60T 8/17558 |
| | | | | 701/301 |
| 2009/0237226 | A1 * | 9/2009 | Okita | B60W 10/184 |
| | | | | 340/435 |
| 2015/0066241 | A1 * | 3/2015 | Akiyama | B60W 10/20 |
| | | | | 701/1 |
| 2015/0175160 | A1 * | 6/2015 | Sudou | B60W 30/09 |
| | | | | 701/70 |
| 2015/0314784 | A1 * | 11/2015 | Ohmori | B60T 7/22 |
| | | | | 701/70 |
| 2016/0332571 | A1 * | 11/2016 | Yokoi | B60T 8/17558 |
| 2018/0201239 | A1 * | 7/2018 | Nakagawa | B60T 8/3255 |
| 2018/0265081 | A1 * | 9/2018 | Yoneda | B60W 40/068 |
| 2019/0096255 | A1 * | 3/2019 | Mills | G01S 17/00 |
| 2019/0180463 | A1 * | 6/2019 | Tsunashima | G06T 7/593 |
| 2019/0189104 | A1 * | 6/2019 | Lewandowski | G10K 15/02 |
| 2019/0259283 | A1 * | 8/2019 | Sung | B60Q 1/46 |
| 2021/0237719 | A1 * | 8/2021 | Chen | F02D 41/0225 |

* cited by examiner

DRIVE ASSIST APPARATUS

CROSS-REFERENCE TO RELATED APPLICATIONS

The present application claims priority from Japanese Patent Application No. 2017-139359 filed on Jul. 18, 2017, the entire contents of which are hereby incorporated by reference.

BACKGROUND

The technology relates to a drive assist apparatus for a vehicle provided with automatic emergency braking that avoids contact between the own vehicle and an obstacle or reduces an influence of the contact between the own vehicle and the obstacle.

Recently, an automatic emergency braking system has been put into practical use in a vehicle such as an automobile. The automatic emergency braking system causes a control system of a vehicle to automatically perform braking to thereby avoid contact between the own vehicle and an obstacle or reduce an influence of the contact between the own vehicle and the obstacle. Such an operation may be performed, for example, in a case where a driver of the vehicle fails to recognize a situation such as deceleration of a preceding vehicle or appearance of the obstacle, and fails to appropriately start an action directed to deceleration of the own vehicle. When an operation target of the automatic emergency braking is a preceding vehicle, for example, estimated contact time may be determined on the basis of a distance from the own vehicle to the preceding vehicle and a relative speed of the own vehicle to that of the preceding vehicle. Further, a target deceleration rate of the automatic emergency braking may be calculated on the basis of the estimated contact time.

When any change is brought to the operation target of the automatic emergency braking due to a reason such as variation in speed of the preceding vehicle or cut-in of another vehicle, it may be necessary to vary the target deceleration rate on an as-needed basis. For example, Japanese Unexamined Patent Application Publication No. H05-270371 discloses a technique that increases the target deceleration rate when another vehicle cuts in between the preceding vehicle and the own vehicle.

SUMMARY

An aspect of the technology provides a drive assist apparatus that includes a detector and a traveling controller. The detector is configured to detect an operation target of automatic emergency braking of a vehicle. The operation target is a target on which the automatic emergency braking of the vehicle is based. The traveling controller includes a calculator and a determiner, and is configured to controls the automatic emergency braking on the basis of a result of the detection performed by the detector. The calculator is configured to calculate each of a target deceleration rate and a variation rate. The target deceleration rate is a target value of a deceleration rate of the automatic emergency braking. The variation rate is a rate of variation in the deceleration rate required for the deceleration rate of the automatic emergency braking to reach the target deceleration rate. The determiner is configured to determine a contact risk on the basis of the target deceleration rate calculated by the calculator. The contact risk is a risk of contact of the vehicle with the operation target. The calculator increases the variation rate when the contact risk is determined by the determiner as being relatively high.

An aspect of the technology provides a drive assist apparatus that includes a detector and circuitry. The detector is configured to detect an operation target of automatic emergency braking of a vehicle. The operation target is a target on which the automatic emergency braking of the vehicle is based. The circuitry is configured to control the automatic emergency braking on the basis of a result of the detection performed by the detector. The circuitry is configured to calculate each of a target deceleration rate and a variation rate. The target deceleration rate is a target value of a deceleration rate of the automatic emergency braking. The variation rate is a rate of variation in the deceleration rate required for the deceleration rate of the automatic emergency braking to reach the target deceleration rate. The circuitry is configured to determine a contact risk on the basis of the calculated target deceleration rate. The contact risk is a risk of contact of the vehicle with the operation target. The circuitry increases the variation rate when the contact risk is determined as being relatively high.

DETAILED DESCRIPTION

A description is given below of some implementations of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

When contact between an own vehicle and an operation target of automatic emergency braking is about to occur in near future due to a reason such as a sudden change in behavior of the operation target, it may be necessary to increase target deceleration rate and promptly vary a deceleration rate of the own vehicle. However, it takes more time to cause the deceleration rate of the vehicle to reach the target deceleration rate as the newly-set target deceleration rate is greater. Therefore, the vehicle may possibly fail to avoid the contact with the operation target, even if the target deceleration rate is increased.

It is desirable to provide a drive assist apparatus that allows prompt variation in deceleration rate.

Figure 1:
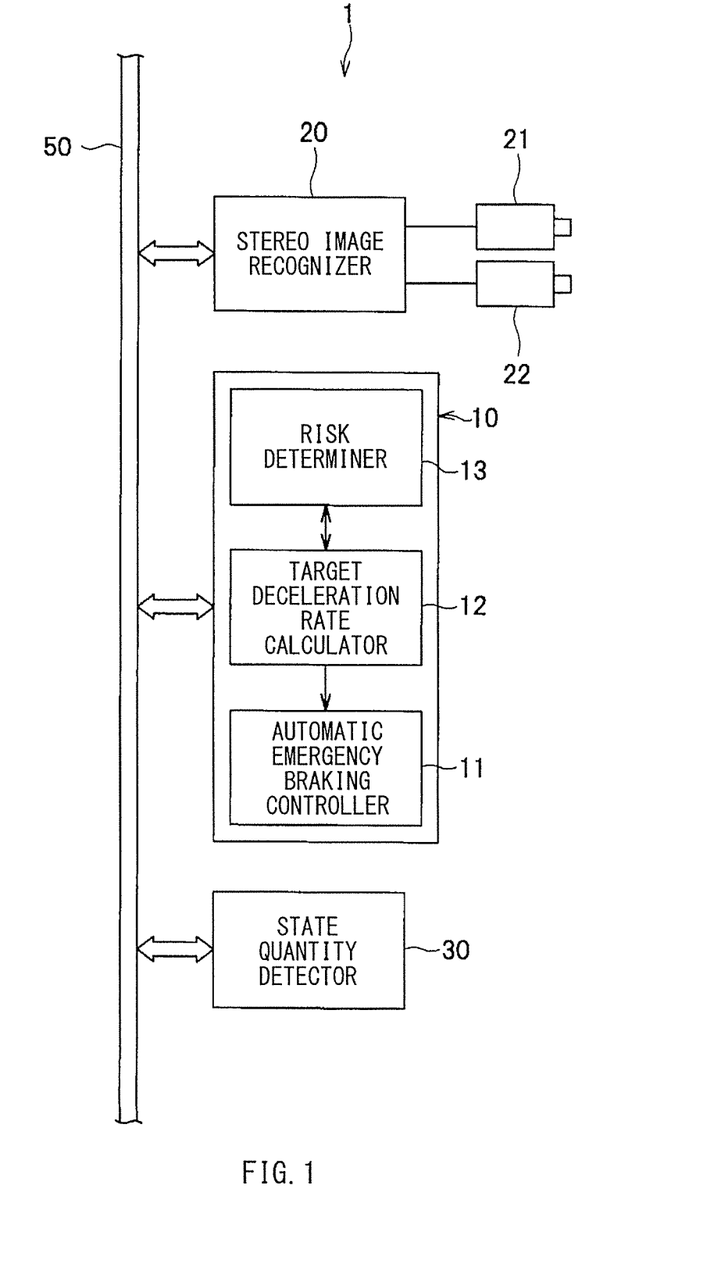
FIG. 1 is a diagram describing an example of a configuration of a traveling control system including a drive assist apparatus according to one implementation of the technology.

A description is given first of a configuration of a drive assist apparatus according to an implementation of the technology, with reference to FIG. 1. FIG. 1 describes a configuration of a traveling control system including the drive assist apparatus according to an implementation of the technology.

A drive assist apparatus 1 according to an implementation of the technology may perform a drive assist control including an automatic emergency braking control that avoids contact between an own vehicle and an obstacle or reduces an influence of the contact between the own vehicle and the obstacle. The drive assist apparatus 1 includes a detector and a traveling controller 10. The detector detects an operation target of the automatic emergency braking of the vehicle. The operation target may be a target on which the automatic emergency braking of the vehicle is based. The traveling controller 10 controls the automatic emergency braking on the basis of a result of the detection performed by the detector.

The detector may be, for example but not limited to, a device that recognizes surroundings outside the vehicle on the basis of information obtained from a sensor. The sensor may be, for example but not limited to, a camera device or a radar device. Non-limiting examples of the camera device may include a stereo camera, a monocular camera, or a color camera. Non-limiting examples of the radar device may include millimeter-wave radar or LiDAR. In one example, the detector may be a stereo image recognizer 20. The stereo image recognizer 20 may process a pair of captured images to thereby three-dimensionally recognize the operation target. The pair of captured images may be captured by a stereo camera including cameras 21 and 22 mounted on the vehicle. The traveling controller 10, the stereo image recognizer 20, and a plurality of devices described later may be coupled to each other via a communication bus 50 that provides a vehicle-mounted network.

The drive assist apparatus 1 may further include a state quantity detector that detects a state quantity of a vehicle. The state quantity detected by the state quantity detector may include, for example but not limited to, a vehicle speed or an acceleration rate of the vehicle. The traveling controller 10 may control the automatic emergency braking on the basis of a result of the detection performed by the state quantity detector 30 and a result of the recognition performed by the stereo image recognizer 20.

In one example, the traveling controller 10 may also serve as a controller that performs a main control of the vehicle. Non-limiting examples of the main control performed by the traveling controller 10 may include an engine control that controls a driving state of an engine of the vehicle, a braking control that controls a braking unit for four wheels, or a steering control that controls an electric power steering motor provided in a steering system of the vehicle.

The communication bus 50 may be further coupled to an own vehicle position information detector, a vehicle-to-vehicle communicator, and a road traffic information communicator, all of which are not illustrated. The traveling controller 10 may perform a drive assist control on the basis of information obtained from a plurality of units including the stereo image recognizer 20 and the state quantity detector 30. Non-limiting examples of the drive assist control may include a constant speed travel control, a follow-up travel control, a lane keep control, a lane departure prevention control, an overtaking control, or a contact avoidance control including the automatic emergency braking control. The traveling controller 10 may also perform an automatic driving control based on combination of the controls referred to above as the non-limiting examples of the drive assist control. A configuration of the traveling controller 10 will be described later in greater detail.

The communication bus 50 may be further coupled to a warning unit that performs warning and notifying for a driver of the vehicle. The warning unit may have a function to warn, on the basis of a command given from the traveling controller 10, the driver about possible contact before the automatic emergency braking is performed. The automatic emergency braking may be performed when the driver fails to perform an action appropriate for avoiding the contact in spite of the foregoing warning made by the warning unit. Non-limiting examples of a case where the driver fails to perform the action appropriate for avoiding the contact may include a case where the driver fails to press down on a brake pedal, or a case where the driver fails to perform steering by means of a steering wheel.

A detailed description is given below of the stereo image recognizer 20 and the cameras 21 and 22 constituting the stereo camera. The cameras 21 and 22 may be shutter-synchronized cameras each having an imaging device such as a charge-coupled device (CCD) or a complementary metal-oxide-semiconductor (CMOS). The cameras 21 and 22 may be provided in the vicinity of a rearview mirror provided inside a windshield, and fixed with a predetermined base line length in a vehicle width direction.

The stereo image recognizer 20 may perform a stereo matching process on a pair of images captured by the respective cameras 21 and 22, to thereby determine a pixel displacement amount, i.e., parallax, between corresponding positions in the respective paired images. Further, the stereo image recognizer 20 may generate a distance image describing a distribution of distance information determined on the basis of the pixel displacement amount. For example, a point in the distance image may be converted into a coordinate value in three-dimensional space. The three-dimensional space may have an origin substantially corresponding to a road surface below a midpoint of the cameras 21 and 22, and have coordinate axes substantially corresponding to three straight lines parallel to the vehicle width direction, a vehicle height direction, and a vehicle length direction, i.e., a distance direction. This allows the stereo image recognizer 20 to three-dimensionally recognize an object such as a lane line of a lane on which the own vehicle travels, e.g., a white line or any other colored line, a sign along the road, a traffic light along the road, another vehicle in front of the own vehicle, another vehicle traveling across in front of the own vehicle, a pedestrian moving across in front of the own vehicle, an oncoming vehicle traveling on an oncoming lane, or an obstacle on the road. A traveling road of the own vehicle may be estimated on the basis of a result of the above-described recognition. The traveling road of the own vehicle refers to a road on which the own vehicle travels. Further, a plurality of three-dimensional objects that are located on the traveling road of the own vehicle or in the vicinity of the traveling road of the own vehicle may be detected on the basis of the result of the above-described recognition.

The operation target of the automatic emergency braking may be selected from the plurality of three-dimensional objects thus detected. For example, the stereo image recognizer 20 may select from the plurality of three-dimensional objects, as the operation target, a three-dimensional object that is located closest to the own vehicle.

A detailed description is given next of a configuration of the traveling controller 10. As illustrated in FIG. 1, the traveling controller 10 in an implementation may include at least an automatic emergency braking controller 11, a target deceleration rate calculator 12, and a risk determiner 13. The automatic emergency braking controller 11 may control the automatic emergency braking.

The target deceleration rate calculator 12 may calculate a target deceleration rate of the automatic emergency braking on the basis of information regarding the operation target detected by the stereo image recognizer 20 and information regarding the state quantity, of the vehicle, detected by the state quantity detector 30. For example, the target deceleration rate calculator 12 may determine estimated contact time on the basis of a distance from the own vehicle to the operation target and a relative speed of the own vehicle to that of the operation target, and calculate the target deceleration rate on the basis of the estimated contact time thus determined. Further, the target deceleration rate calculator 12 may calculate a rate of variation in deceleration rate required for the deceleration rate of the vehicle to reach the target deceleration rate. For example, the target deceleration rate calculator 12 may calculate jerk that is a temporal variation rate of deceleration rate.

The risk determiner 13 may determine a risk of contact between the own vehicle and the operation target of the automatic emergency braking. In an implementation, the risk determiner 13 may determine the risk of contact with the operation target on the basis of the target deceleration rate. The process of calculating the target deceleration rate and the jerk performed by the target deceleration rate calculator 12 and the process of determining the risk of contact with the operation target performed by the risk determiner 13 may be performed repeatedly as a series of processes while the automatic emergency braking is performed. The process of calculating the target deceleration rate and the jerk performed by the target deceleration rate calculator 12 may be hereinafter referred to as a "deceleration rate calculation process". The process of determining the risk of contact with the operation target performed by the risk determiner 13 may be hereinafter referred to as a "risk determination process". The foregoing series of processes will be described later in greater detail.

The target deceleration rate calculator 12 may adjust a value of the jerk on the basis of a result of the determination performed by the risk determiner 13. For example, the target deceleration rate calculator 12 may increase the value of the jerk when the risk of contact with the operation target is determined by the risk determiner 13 as being relatively high.

The automatic emergency braking controller 11 may so control a device such as a braking device that the automatic emergency braking is performed in accordance with the target deceleration rate calculated by the target deceleration rate calculator 12 and the jerk calculated and adjusted by the target deceleration rate calculator 12.

Figure 2:
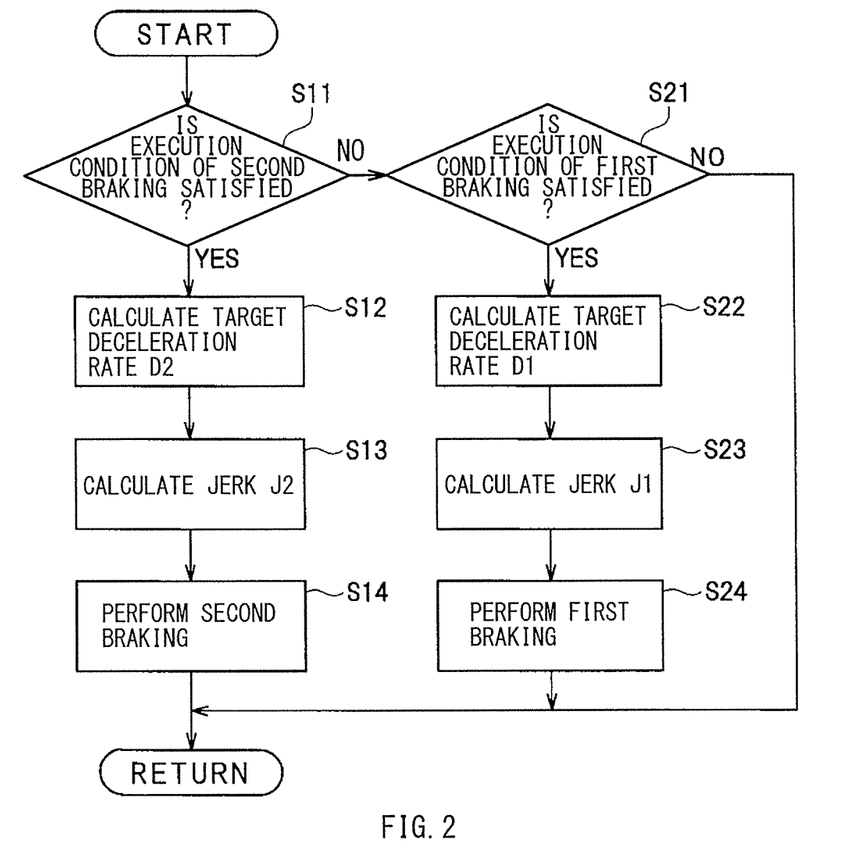
FIG. 2 is a flowchart illustrating an example of a basic execution procedure of automatic emergency braking according to one implementation of the technology.

A description is given next of an execution process of the automatic emergency braking according to an implementation. FIG. 2 is a flowchart illustrating a basic execution process of the automatic emergency braking. The procedure illustrated in FIG. 2 may be performed repeatedly with a predetermined period.

In one example illustrated in FIG. 2, the automatic emergency braking may include first braking and second braking. The first braking may be mainly directed to warning to the driver. The second braking may be mainly directed to avoidance of contact with the obstacle or reduction of the influence of the contact with the obstacle in a case where the driver fails to perform an appropriate action for avoiding the contact. A maximum value of the deceleration rate upon the second braking may be greater than deceleration rate upon the first braking.

First, in step S11, the automatic emergency braking controller 11 may determine whether an execution condition of the second braking is satisfied. The execution condition of the second braking may be defined, for example, on the basis of the estimated contact time and predetermined reference time at which the second braking is to be performed. The predetermined reference time at which the second braking is to be performed may be hereinafter referred to as "second reference time". In the example illustrated in FIG. 2, the execution condition of the second braking may be determined as being satisfied when the estimated contact time is equal to or less than the second reference time.

When the execution condition of the second braking is determined as being satisfied in step S11 (step S11: YES), the flow may proceed to step S12. In step S12, the target deceleration rate calculator 12 may calculate second target deceleration rate that is the target deceleration rate upon the second braking. Hereinafter, the second target deceleration rate may be referred to as a "target deceleration rate D2". Thereafter, in step S13, the target deceleration rate calculator 12 may calculate jerk J2 as a second variation rate that is a rate of variation in deceleration rate required for the deceleration rate of the vehicle to reach the target deceleration rate D2. Thereafter, in step S14, the automatic emergency braking controller 11 may vary the deceleration rate in accordance with the calculated target deceleration rate D2 and the calculated jerk J2, to thereby perform the second braking. It is to be noted that, when the target deceleration rate D2 and the jerk J2 are updated by the deceleration rate calculation process and the risk determination process that are described later, the second braking may be performed in accordance with the updated target deceleration rate D2 and the updated jerk J2.

When the execution condition of the second braking is determined as not being satisfied in step S11 (step S11: NO), the flow may proceed to step S21. In step S21, the automatic emergency braking controller 11 may determine whether an execution condition of the first braking is satisfied. The execution condition of the first braking may be defined, for example, on the basis of the estimated contact time and predetermined reference time at which the first braking is to be performed. The predetermined reference time at which the first braking is to be performed may be hereinafter referred to as "first reference time". In the example illustrated in FIG. 2, the execution condition of the first braking may be determined as being satisfied when the estimated contact time is equal to or less than the first reference time.

When the execution condition of the first braking is determined as being satisfied in step S21 (step S21: YES), the flow may proceed to step S22. In step S22, the target deceleration rate calculator 12 may calculate first target deceleration rate that is the target deceleration rate upon the first braking. Hereinafter, the first target deceleration rate may be referred to as a "first deceleration rate D1". Thereafter, in step S23, the target deceleration rate calculator 12 may calculate jerk J1 as a first variation rate that is a rate of variation in deceleration rate required for the deceleration rate of the vehicle to reach the target deceleration rate D1. Thereafter, in step S24, the automatic emergency braking controller 11 may vary the deceleration rate in accordance with the calculated target deceleration rate D1 and the calculated jerk J1, to thereby perform the first braking.

When the execution condition of the first braking is determined as not being satisfied in step S21 (step S21: NO), the automatic emergency braking may not be performed.

Figure 3:
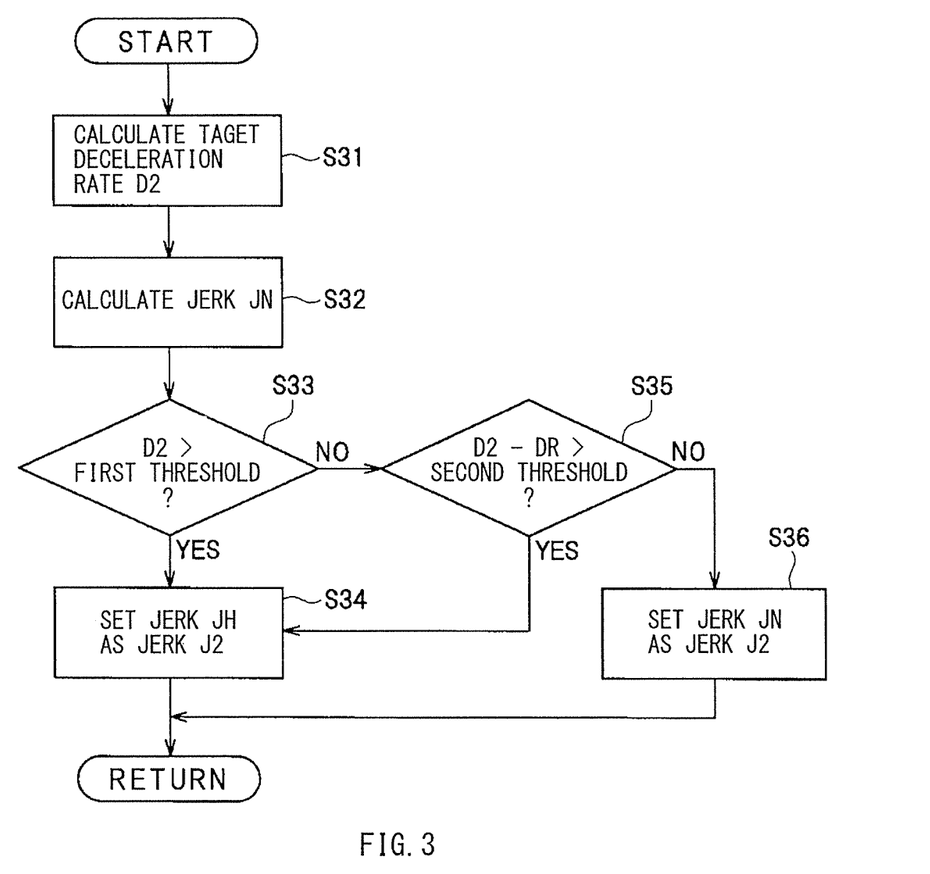
FIG. 3 is a flowchart illustrating an example of a deceleration rate calculation process and a risk determination process according to one implementation of the technology.

A detailed description is given next of the deceleration rate calculation process and the risk determination process with reference to FIG. 3. As described above, the deceleration rate calculation process and the risk determination process may be performed repeatedly as a series of processes with a predetermined period while the automatic emergency braking is performed.

First, in step S31, the target deceleration rate calculator 12 may calculate the target deceleration rate D2. Thereafter, in step S32, the target deceleration rate calculator 12 may calculate jerk JN that is a candidate for the jerk J2.

Thereafter, in step S33, the risk determiner 13 may perform a first determination process. In the first determination process, the risk determiner 13 may compare the target deceleration rate D2 with a predetermined first threshold, to thereby determine whether the target deceleration rate D2 is greater than the first threshold. For example, the first threshold may be a relatively-great value that is equal to or greater than about 0.9 G (1 G=9.8 m/s$^2$). When the target deceleration rate D2 is greater than the first threshold (step S33: YES), the risk determiner 13 may determine that the risk of contact with the operation target is relatively high, and the flow may proceed to step S34. In step S34, the target deceleration rate calculator 12 may calculate, in accordance with a predetermined rule, jerk JH that is greater than the jerk JN, and set the calculated jerk JH as the jerk J2. Non-limiting examples of the predetermined rule may include to set a predetermined value as a value of the jerk JH, to calculate the value of the jerk JH by adding a predetermined value to a value of the jerk JN, or to calculate the jerk JH by multiplying the jerk JN by a predetermined value.

When the target deceleration rate D2 is equal to or smaller than the first threshold (step S33: NO), the flow may proceed to step S35. In step S35, the risk determiner 13 may perform a second determination process. In the second determination process, the risk determiner 13 may first set reference deceleration rate DR. The reference deceleration rate DR may be set on the basis of the target deceleration rate calculated in the past and the jerk calculated in the past. In an implementation, the reference deceleration rate DR may be basically set on the basis of the target deceleration rate D1 upon the first braking and the jerk J1 upon the first braking. For example, when the deceleration rate upon the first braking has reached the target deceleration rate D1, the target deceleration rate D1 may be set as the reference deceleration rate DR. When the deceleration rate upon the first braking has not reached the target deceleration rate D1 yet, a current value of the deceleration rate that is increased in accordance with the jerk J1 may be set as the reference deceleration rate DR. When the first braking is not performed, a predetermined value, e.g., 0 (zero), may be set to the reference deceleration rate DR.

Thereafter, the risk determiner 13 may determine a target deceleration rate difference, and compare the determined target deceleration rate difference and a predetermined second threshold with each other, to thereby determine whether the target deceleration rate difference is greater than the second threshold in step S35. The target deceleration rate difference may be calculated by arithmetic operation that includes determination of a difference between the target deceleration rate D2 and the reference deceleration rate DR, i.e., a difference (D2−DR). As used herein, the wording "arithmetic operation that includes determination of the difference between the target deceleration rate D2 and the reference deceleration rate DR", "arithmetic operation that includes determination of the difference (D2−DR)", or its variants encompasses performing any other arithmetic operation such as determination of an absolute value of the difference (D2−DR) after the determination of the difference (D2−DR). In an implementation, the difference (D2−DR) may be used as the above-described target deceleration rate difference. When the difference (D2−DR) is greater than the second threshold (step S35: YES), the risk determiner 13 may determine the risk of contact with the operation target as being relatively high. In this case, the target deceleration rate calculator 12 may set, as the jerk J2, the jerk JH calculated as described above (step S34).

When the difference (D2−DR) is equal to or smaller than the second threshold (step S35: NO), the flow may proceed to step S36. In step S36, the target deceleration rate calculator 12 may set the jerk JN as the jerk J2.

As described above, in an implementation, the risk determiner 13 may determine the risk of contact with the operation target as being relatively high on any of: a condition that the target deceleration rate D2 is greater than the first threshold; and a condition that the target deceleration rate difference, e.g., the difference (D2−DR) is greater than the second threshold. When the risk of contact with the operation target is determined by the risk determiner 13 as being relatively high, the target deceleration rate calculator 12 may increase the value of the jerk. According to an implementation, this makes it possible to promptly vary the deceleration rate. As a result, it is possible to avoid the contact with the operation target or reduce the influence of the contact with the operation target, e.g., reduce the shock of the contact with the operation target. This effect is described in detail below with reference to FIGS. 4 to 7.

Figure 4:
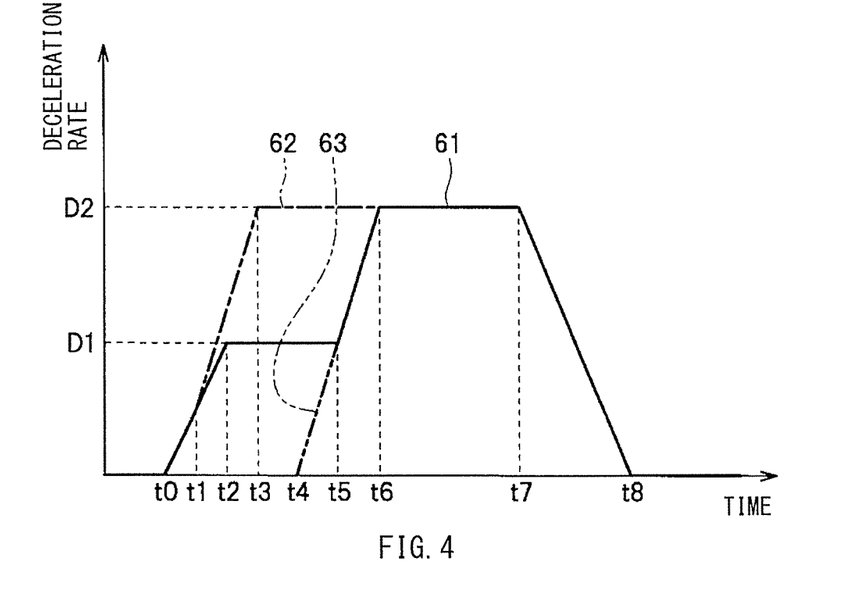
FIG. 4 is a diagram schematically describing an example of a control pattern of the automatic emergency braking according to one implementation of the technology.

FIG. 4 schematically illustrates a control pattern of the automatic emergency braking. In FIG. 4, a horizontal axis indicates time, and a vertical axis indicates deceleration rate. Symbols t0 to t8 provided on the horizontal axis each indicate time. The time t0 indicates timing at which the control of the automatic emergency braking is started in cases other than the cases of third and fourth examples which will be described later. The time t8 indicates timing at which the control of the automatic emergency braking is ended. It is to be noted that the magnitude of the deceleration rate and the state of variation may be different from the actual magnitude of the deceleration rate and the actual state of variation in FIG. 4 for illustration purpose.

Figure 5:
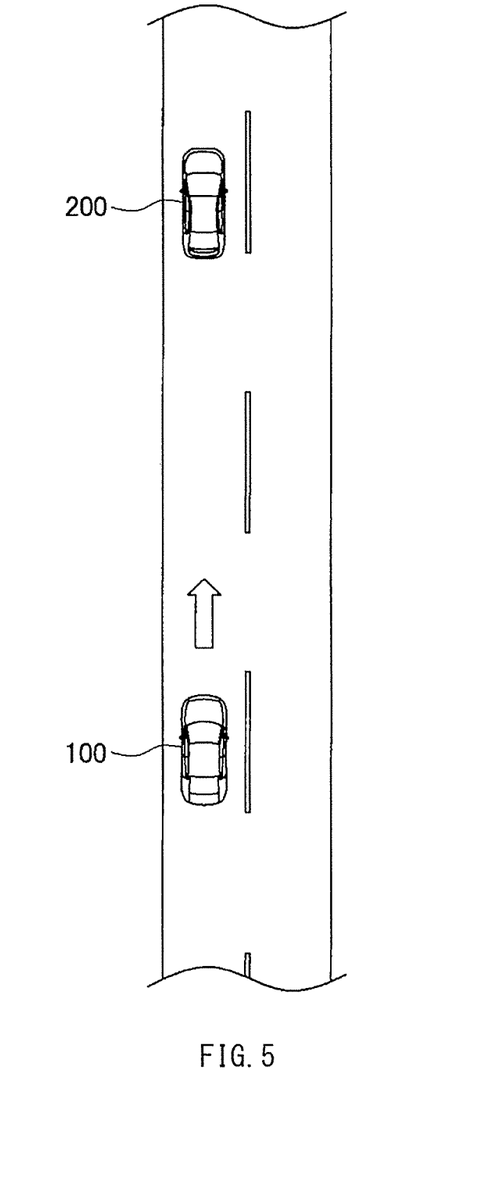
FIG. 5 is a diagram describing a first example and a second example of a case in which the automatic emergency braking is to be performed.
Figure 6:
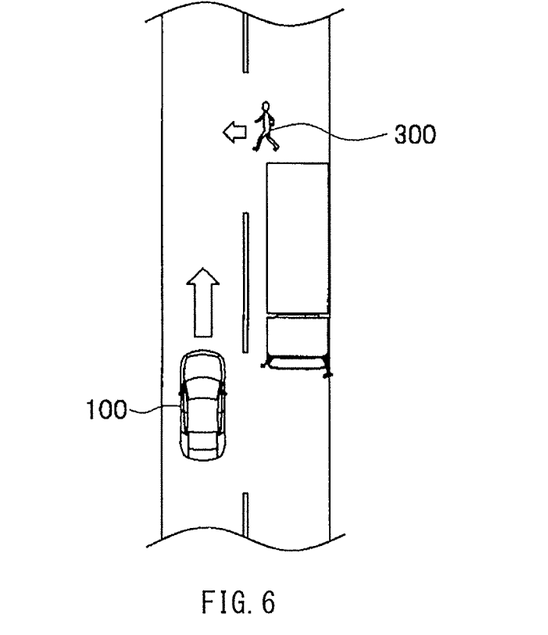
FIG. 6 is a diagram describing a third example of the case in which the automatic emergency braking is to be performed.
Figure 7:
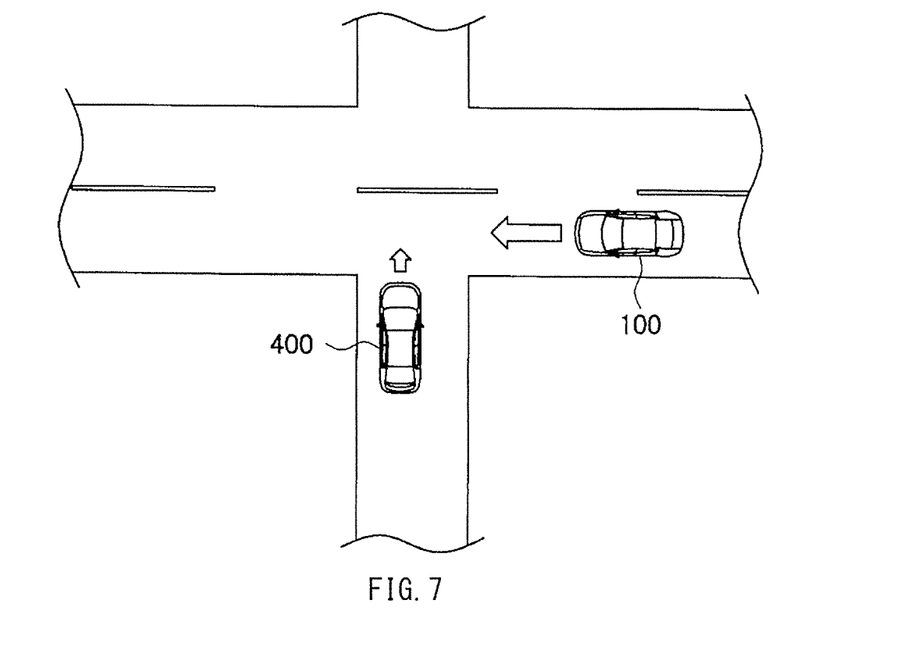
FIG. 7 is a diagram describing a fourth example of the case in which the automatic emergency braking is to be performed.

FIG. 5 illustrates a first example and a second example in each of which the automatic emergency braking is performed. FIG. 6 illustrates the third example in which the automatic emergency braking is performed. FIG. 7 illustrates a fourth example in which the automatic emergency braking is performed.

The first example is a case where the operation target of the automatic emergency braking is a vehicle 200 that is present in front of a own vehicle 100 on a road on which the own vehicle 100 travels. Hereinafter, the vehicle 200 that is present in front of the own vehicle 100 on the road on which the own vehicle 100 travels may be simply referred to as the "preceding vehicle 200". In the first example, the preceding vehicle 200 is stopped for a reason such as a traffic signal. In the first example, the automatic emergency braking may be performed in accordance with a control pattern that is indicated by a solid line denoted with a numeral 61 in FIG. 4. The first braking may be performed first in the first example. In a time period from the time t0 to time t2, the automatic emergency braking controller 11 may increase the deceleration rate on the basis of the jerk J1. It is to be noted that a slope of the solid line in the time period from the time t0 to the time t2 may correspond to the jerk J1.

A time period from the time t2 to time t5 may be a time period after the deceleration rate reaches the target deceleration rate D1. In this time period, the automatic emergency braking controller 11 may keep the deceleration rate at a constant value, e.g., the target deceleration rate D1.

The second braking may be performed at or after the time t5 in the first example. The first example refers to a case where the risk of contact with the operation target is not determined as being relatively high through any of the first determination process and the second determination process at the time t5. In a time period from the time t5 to time t6, the automatic emergency braking controller 11 may increase the deceleration rate on the basis of the jerk J2. It is to be noted that a slope of the solid line in the time period from the time t5 to the time t6 may correspond to the jerk J2.

A time period from the time t6 to time t7 may be a time period after the deceleration rate reaches the target deceleration rate D2. In this time period, the automatic emergency braking controller 11 may keep the deceleration rate at a constant value, e.g., the target deceleration rate D2.

In a time period from the time t7 to time t8, the automatic emergency braking controller 11 may decrease the deceleration rate. When the deceleration rate becomes 0 (zero) at the time t8, the control of the automatic emergency braking may be ended.

The second example is a case where the own vehicle 100 and the preceding vehicle 200 travel at respective speeds that are similar to each other, and the preceding vehicle 200 performs sudden deceleration. In the second example, the automatic emergency braking may be performed in accordance with a control pattern that is indicated by a dashed-one-dotted line denoted with a numeral 62 in FIG. 4. It is to be noted that the dashed-one-dotted line and the solid line overlap each other in the time period from the time t0 to the time t1 and the time period from the time t6 and the time t8 in FIG. 4. The first braking may be performed first in the second example. In a time period from the time t0 to time t1, the automatic emergency braking controller 11 may increase the deceleration rate on the basis of the jerk J1.

The second example refers to a case where the risk of contact with the operation target is determined as being relatively high through any of the first determination process and the second determination process at the time t1. In this case, the deceleration rate at the time t1 may be set as the reference deceleration rate DR. In the second example, the jerk JH may be set as the jerk J2, and the second braking may be performed on the basis of the jerk J2 which is set to be the jerk JH. In a time period from the time t1 to time t3, the automatic emergency braking controller 11 may increase the deceleration rate on the basis of the jerk J2, i.e., the jerk JH. It is to be noted that a slope of the dashed-one-dotted line in the time period from the time t1 to the time t3 may correspond to the jerk JH in FIG. 4. In FIG. 4, the slope of the dashed-one-dotted line corresponding to the jerk JH and the slope of the solid line corresponding to the jerk J2 are illustrated as being substantially the same as each other for illustration purpose.

A time period from the time t3 to time t7 may be a time period after the deceleration rate reaches the target deceleration rate D2. In this time period, the automatic emergency braking controller 11 may keep the deceleration rate at a constant value, e.g., the target deceleration rate D2.

As described above, the jerk JH may be set as the jerk J2 in the second example, putting priority on avoidance of contact. This makes it possible to reduce the time period that allows the deceleration rate to reach the target deceleration rate D2, compared to a case where a jerk smaller than the jerk JH is set as the jerk J2.

It is to be noted that the target deceleration rate calculator 12 may calculate each of the target deceleration rate and the jerk a plurality of times while the control of the automatic emergency braking is performed. In a case where the second braking is performed after the first braking is performed as in the second example, the target deceleration rate calculator 12 may calculate, as the target deceleration rate, each of the target deceleration rate D1 of the first braking and the target deceleration rate D2 of the second braking at least once, and calculate, as the jerk, each of the jerk J1 of the first braking and the jerk J2 of the second braking at least once.

The third example is a case where the operation target of the automatic emergency braking is a pedestrian 300 that rushes out in front of the own vehicle 100. The fourth example is a case where the operation target of the automatic emergency braking is another vehicle 400 that travels across in front of the own vehicle 100. In each of the third and fourth examples, the automatic emergency braking may be performed in accordance with a control pattern that is indicated by a dashed-two-dotted line denoted with a numeral 63 in FIG. 4. It is to be noted that the dashed-two-dotted line and the solid line overlap each other in the time period from the time t5 to the time t8 in FIG. 4. In each of the third and fourth examples, the first braking may be not be performed at all or hardly performed, and the second braking may be performed.

Each of the third and fourth examples refers to a case where the risk of contact with the operation target is determined as being relatively high through any of the first determination process and the second determination process described above at the time t4. In this case, the jerk JH may be set as the jerk J2 as described above. In a time period from the time t4 to time t6, the automatic emergency braking controller 11 may increase the deceleration rate on the basis of the jerk J2, i.e., the jerk JH. It is to be noted that a slope of the dashed-two-dotted line in the time period from the time t4 to the time t6 may correspond to the jerk JH. In FIG. 4, the slope of the dashed-two-dotted line corresponding to the jerk JH and the slope of the solid line corresponding to the jerk J2 are illustrated as being substantially the same as each other for illustration purpose.

A time period from the time t6 to time t7 may be a time period after the deceleration rate reaches the target deceleration rate D2. In this time period, the automatic emergency braking controller 11 may keep the deceleration rate at a constant value, e.g., the target deceleration rate D2.

As described above, the jerk JH may be set as the jerk J2 in each of the third and fourth examples, putting priority on avoidance of contact. This makes it possible to reduce the time period that allows the deceleration rate to reach the target deceleration rate D2, compared to a case where a jerk smaller than the jerk JH is set as the jerk J2.

As described above, in an implementation, when the risk of contact with the operation target is determined by the risk determiner 13 as being relatively high, the target deceleration rate calculator 12 may increase the value of the jerk. According to an implementation, this makes it possible to reduce the time period that allows the deceleration rate to reach the target deceleration rate D2. Accordingly, it is possible to promptly vary the deceleration rate according to one implementation. As a result, it is possible to avoid the contact with the operation target or reduce the influence of the contact with the operation target, e.g., reduce the shock of the contact with the operation target.

Moreover, the risk of contact with the operation target may be determined on the basis of the target deceleration rate, for example, on the basis of the target deceleration rate D2 and the reference deceleration rate DR in one implementation as described above. Hence, it is possible to determine the risk of contact with the operation target more easily according to one implementation of the technology.

In general, a magnitude of jerk is limited in order to reduce a risk of occurrence of rear-end contact with a following vehicle or any other situation. In contrast, the value of the jerk may be increased when the risk of contact is relatively high, putting priority on avoidance of contact in an implementation of the technology, as described above.

One reason why the risk of contact is determined as being relatively high when the target deceleration rate D2 is greater than the first threshold is as follows. For example, in a case where the operation target appears suddenly as in the third and fourth examples, there is not much extra time for stopping the own vehicle. Therefore, the target deceleration rate D2 may be set to a value as great as possible. When the target deceleration rate D2 is relatively great as in the above-described case, it is highly possible that the contact is about to occur in near future, and therefore, the risk of contact may be determined as being relatively high.

One reason why the risk of contact is determined as being relatively high when the difference (D2−DR) is greater than the second threshold although the target deceleration rate D2 is equal to or smaller than the first threshold is as follows. For example, in a case where a preceding vehicle performs sudden deceleration as in the second example, a distance between the own vehicle and the preceding vehicle is decreased rapidly. In such a case, timing of intervention by means of the second braking may be made earlier, and the value of the reference deceleration rate DR may be therefore decreased. As a result, the difference (D2−DR) may be increased. When the difference (D2−DR) is relatively great as in the above-described case, it is highly possible that the behavior of the operation target varies suddenly, and therefore, the risk of contact may be determined as being relatively high.

Each of the traveling controller 10 and the stereo image recognizer 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the traveling controller 10 and the stereo image recognizer 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the traveling controller 10 and the stereo image recognizer 20 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A drive assist apparatus comprising:
   a detector including a sensor, the detector being provided on a vehicle, the detector being configured to detect a three-dimensional object located in surroundings outside the vehicle; and
   a controller configured to:
      estimate, based on a detection result of the detector, a contact time for the vehicle to contact the three-dimensional object;
      execute repeatedly a series of processes comprising i) setting a target deceleration rate of the vehicle and ii) setting a jerk of the vehicle; and
      execute automatic emergency braking of the vehicle based on the target deceleration rate and the jerk,
   wherein the automatic emergency braking includes first braking and second braking,
   wherein a maximum value of a deceleration rate upon the second braking is greater than a decelerator rate upon the first braking,
   wherein, in response to determining that an execution condition of the second braking is satisfied, the controller executes the second braking based on a second target deceleration rate and one of a second jerk and a third jerk, the execution condition of the second braking including the estimated contact time being equal to or less than a second reference time,
   wherein, in response to determining that an execution condition of the first braking is satisfied, the controller executes the first braking based on a first target deceleration rate and a first jerk, the first jerk being less than the second jerk, the execution condition of the first braking including (i) the execution condition of the second braking being not satisfied and (ii) the estimated contact time being equal to or less than a first reference time, and
   wherein the series of processes further comprises:
      in response to determining that the execution condition of the second braking is satisfied:
         calculating, based on the estimated contact time, the second target deceleration rate being a target value of a deceleration rate of the second braking;
         setting the second target deceleration rate as the target deceleration rate;
         calculating, based on the second target deceleration rate, the second jerk being a rate of variation in the deceleration rate required for the deceleration rate of the second braking to reach the second target deceleration rate;

setting the second jerk as the jerk of the vehicle; and changing the jerk of the vehicle from the second jerk to the third jerk that is greater than the second jerk based on determining that a difference between the second target deceleration rate and a reference deceleration rate is greater than a predetermined threshold;

in response to determining that the execution condition of the first braking is satisfied:

calculating the first target deceleration rate being a target value of a deceleration rate of the first braking;

setting the first target deceleration rate as the target deceleration rate;

calculating, based on the first target deceleration rate, the first jerk being a rate of variation in the deceleration rate required for the deceleration rate of the first braking to reach the first target deceleration rate;

setting the first jerk as the jerk of the vehicle;

setting, when the deceleration rate upon the first braking reaches the first target deceleration rate, the first target deceleration rate as the reference deceleration rate; and setting, when the deceleration rate upon the first braking does not reach the first target deceleration rate, a current value of the deceleration rate that is increased in accordance with the jerk of the vehicle as the reference deceleration rate; and setting, when the first braking is not performed, zero to the reference deceleration rate.

2. The drive assist apparatus according to claim 1, wherein the detector comprises a stereo image recognizer configured to process a pair of captured images to three-dimensionally recognize the three-dimensional object, the pair of captured images being captured by a stereo camera mounted on the vehicle.

3. A drive assist apparatus comprising:

a detector including a sensor, the detector being provided on a vehicle, the detector being configured to detect a three-dimensional object located in surroundings outside the vehicle; and circuitry configured to:

estimate, based on a detection result of the detector, a contact time for the vehicle to contact the three-dimensional object;

execute repeatedly a series of processes comprising i) setting a target deceleration rate of the vehicle and ii) setting a jerk of the vehicle; and execute automatic emergency braking of the vehicle based on the target deceleration rate and the jerk, wherein the automatic emergency braking includes first braking and second braking, wherein a maximum value of a deceleration rate upon the second braking is greater than a decelerator rate upon the first braking, wherein, in response to determining that an execution condition of the second braking is satisfied, the circuitry executes the second braking based on a second target deceleration rate and one of a second jerk and a third jerk, the execution condition of the second braking including the estimated contact time being equal to or less than a second reference time, wherein, in response to determining that an execution condition of the first braking is satisfied, the circuitry executes the first braking based on a first target deceleration rate and a first jerk, the first jerk being less than the second jerk, the execution condition of the first braking including (i) the execution condition of the second braking being not satisfied and (ii) the estimated contact time being equal to or less than a first reference time, and wherein the series of processes further comprises:

in response to determining that the execution condition of the second braking is satisfied:

calculating, based on the estimated contact time, the second target deceleration rate being a target value of a deceleration rate of the second braking;

setting the second target deceleration rate as the target deceleration rate;

calculating, based on the second target deceleration rate, the second jerk being a rate of variation in the deceleration rate required for the deceleration rate of the second braking to reach the second target deceleration rate;

setting the second jerk as the jerk of the vehicle; and changing the jerk of the vehicle form the second jerk to the third jerk that is greater than the second jerk based on determining that a difference between the second target deceleration rate and a reference deceleration rate is greater than a predetermined threshold;

in response to determining that the execution condition of the first braking is satisfied:

calculating the first target deceleration rate being a target value of a deceleration rate of the first braking;

setting the first target deceleration rate as the target deceleration rate;

calculating, based on the first target deceleration rate, the first jerk being a rate of variation in the deceleration rate required for the deceleration rate of the first braking to reach the first target deceleration rate;

setting the first jerk as the jerk of the vehicle;

setting, when the deceleration rate upon the first braking reaches the first target deceleration rate, the first target deceleration rate as the reference deceleration rate; and setting, when the deceleration rate upon the first braking does not reach the first target deceleration rate, a current value of the deceleration rate that is increased in accordance with the jerk of the vehicle as the reference deceleration rate; and setting, when the first braking is not performed, zero to the reference deceleration rate.

\* \* \* \* \*